United States Patent [19]

Pletzer et al.

[11] 3,981,950

[45] Sept. 21, 1976

[54] METHOD FOR PRODUCTION OF CEMENT-BONDED MOLDED ARTICLES PARTICULARLY LIGHTWEIGHT FIBER BOARDS

[75] Inventors: Fridolin Pletzer; Hubert Strasser, both of Ferndorf; Hans Tschernuth, Villach, all of Austria

[73] Assignee: Osterreichisch-Amerikanische Magnesit Aktiengesellschaft, Radenthein, Austria

[22] Filed: Dec. 11, 1973

[21] Appl. No.: 423,723

[30] Foreign Application Priority Data

Dec. 11, 1972 Austria .............................. 10489/72

[52] U.S. Cl. ................................ 264/109; 106/104; 264/110; 264/124; 264/125
[51] Int. Cl.² ............................................. B29J 5/00
[58] Field of Search ........... 264/109, 110, 124, 125; 106/104

[56] References Cited
UNITED STATES PATENTS

| | | | |
|---|---|---|---|
| 3,271,492 | 9/1966 | Elmendorf | 264/122 |
| 3,767,435 | 10/1973 | Mori et al. | 106/104 |
| 3,819,389 | 6/1974 | Uchikawa et al. | 106/104 |

*Primary Examiner*—Donald J. Arnold
*Assistant Examiner*—John Parrish
*Attorney, Agent, or Firm*—Brian G. Brunsvold; Herbert H. Mintz; Everett H. Murray, Jr.

[57] ABSTRACT

Method for the production of cement-bonded molded articles, particularly lightweight boards of wood fiber, wood chips or other lignocelluloses, of mineral fibers, glass fibers, plastic chips and fibers or various lightweight materials, like expanded silicates, expanded clay or expanded glass or granules of foamed plastics as a base material and portland cement as a binder, characterized in that the molded articles are produced in a heated molding duct formed of endless moving belts, for example, steel belts, using a portland cement as a binder in the molding compound which contains 1 to 30% by weight, perferably 15 to 25% by weight, of a calcium-halogen aluminate of the composition $11CaO.7Al_2O_3.CaX_2$ wherein X is any halogen. The cement with added calcium-halogen aluminate has such a short setting time, which is further accelerated by heating during molding, that boards may be successfully made on a continuous basis using a belt-molding machine.

8 Claims, No Drawings

METHOD FOR PRODUCTION OF CEMENT-BONDED MOLDED ARTICLES PARTICULARLY LIGHTWEIGHT FIBER BOARDS

The invention relates to a method for the production of molded articles, particularly cement-bonded lightweight fiber boards, in a continuous operation.

BACKGROUND OF THE INVENTION

For molded articles with a mineral bond, used primarily in construction as lightweight fiber boards, an organic or inorganic fibrous material can be used as a base material. For example, wood fiber, wood chips, sawdust, pulpwood and other lignocelluloses, mineral fibers, such as slag wool, glass fibers, as well as plastic chips and fibers can be used. However, the base material can also consist of lightweight materials of various types, such as, for example, those on the basis of expanded silicates (e.g. perlite) or expanded micas (e.g. vermiculite), expanded clays or expanded glass, or on an organic basis, for which among others granules of foamed plastics (e.g. preformed polystyrene) are suitable as fillers. The lightweight materials can be used for reinforcement purposes, also in combination with the above mentioned fibrous materials.

The mineral binders which are used primarily in the building material industry for the production of molded articles are portland cement and magnesia cement. In the production of boards and molded articles in individual molds it is irrelevant which binder is used.

Quite different, however, are the conditions if the production of the boards is to be effected continuously in a molding duct formed of endless moving belts, particularly steel belts, also called a belt-molding machine. In the belt-molding machine, the provisional setting of the molded material must be effected so fast that the endless rope emerging from the molding duct can be cut into individual boards without damage, and the boards must be so easy to handle that they can be transported into storage rooms for the final setting. In order to be able to produce boards economically, the setting times and stay periods respectively in the molding duct must not exceed about 5 to 6 minutes.

Under these conditions, it was heretofore possible to work only with magnesia cement, whose setting can be sufficiently accelerated by heat supply in the molding duct. Portland cement, on the other hand, sets much too slowly; and it is possible only to a limited extent to accelerate the setting by heat supply, particularly in the case of wood as a base material, where a great delay of the solidification process is caused by the active wood substances. The addition of accelerators, such as calcium chloride, does not permit either magnesia cement or portland cement to achieve even an approximately adequate setting time.

SUMMARY OF THE INVENTION

It was found that it is still possible to produce molded articles, particularly lightweight fiber boards, with a bond on the basis of portland cement in the belt-molding machine if a quick-setting portland cement of a certain composition, which has only recently become known, is selected for the present special purpose and its setting time is further reduced by heat supply. The method according to the invention is thus characterized in that the molded articles are produced from the molding compound formed of the base material and binder in a heated molding duct formed of endless moving belts, for example steel belts, the binder used in the molding compound being a portland cement which contains 1 to 30% by weight, preferably 15 to 25% by weight, of a calcium-halogen aluminate of the composition $11CaO.7Al_2O_3.CaX_2$ wherein X is any halogen. Particularly good results are obtained if the halogen is fluorine.

It was found surprisingly that a cement with the indicated content of calcium-halogen aluminate not only sets quickly, but that beyond that, such an acceleration of the setting time can be achieved by the heat supply that it is possible to work with stay periods in the molding duct of only about 5 minutes, just as with magnesia cement. Besides, no delay of the setting is effected in such a cement by active wood substances.

DETAILED DESCRIPTION OF THE INVENTION

In the practical realization of the method according to the invention the heat supply in the molding duct is effected best by heating gases. The heat supply is preferably so regulated that the board material attains in the molding duct temperatures of 45° to 120°C., preferably 70° to 90°C.

The portland cement used according to the invention can contain with advantage 1 to 12% by weight $SO_3$ in the form of calcium sulphate, plaster of paris gypsum, or mixtures of these sulfates.

Another improvement of the method according to the invention can be achieved by adding the following substances, individually or severally at the same time, to the cement containing the above described calcium-halogen aluminate: natural or synthetic pozzoulana, flue dust, fine-grained blast furnace slag, sodium fluoride, magnesium silicoflouride, waterglass, caustic soda, sodium bicarbonate or similar substances which reduce the calcium ion concentration in the liquid phase or which bind calcium ions. By means of these additives, the stay period in the belt-molding machine can be further reduced.

All these additives should preferably be already added to the portland cement in the factory because of the necessary fine distribution. The same holds true for an addition of cement of conventional composition, according to another feature of the invention, by which the strength development is surprisingly further improved and the economy of the process is favorably influenced.

We will describe below more fully on the basis of non-limiting embodiments the method according to the invention for the production of cement-bonded molded articles, particularly for lightweight wood fiber boards, making also a comparison with magnesia cement-bonded boards.

EXAMPLE 1

For the production of a cement-bonded lightweight wood fiber board we selected as a binder a special cement on the basis of portland cement which contained 20% by weight of the compound $11CaO.7Al_2O_3.CaF_2$ and about 16% by weight of a mixture of 70% by weight $CaSO_4$ and 30% $CaSO_4.2H_2O$.

This cement had a $SO_3$ content of 8.5% by weight. This cement was mixed thoroughly with 20 parts by weight water and 16 parts by weight wood fiber (reference kiln-dry moisture 30%). This mixture (molding compound) was then introduced continuously into a molding duct of 50 cm width and 2.5 cm height formed of endless steel belts. The molding duct was so heated that a temperature of 80°C. was attained in the material to be deformed. The stay period in the molding duct was about 6 minutes. The rope formed was sufficiently strong on leaving the duct so that individual boards could be cut off and handled.

The boards thus produced were stored for 10 days at about 40°C. and then tested for their strength (ultimate strength). To this end they were placed on a support arranged in a distance of 47 cm and then loaded in the center. The breaking load as a mean of several tests was 85 kp.

EXAMPLE 2

As a binder was used a cement of the same basic composition as in example 1, but with the difference that 0.5% by weight sodium fluoride in a very fine and even distribution was already added in the factory. The stay period in the molding duct was about 5 minutes, after which time the necessary strength and contour-stability had already been achieved. All other conditions were exactly the same as in example 1. Despite the shorter stay period, ultimate strength values of 105 kp can be obtained on the average.

EXAMPLE 3

A cement as in example 2 was used in which 20% regular cement of the quality PZ475 had already been added in the factory. All other conditions in the production of the lightweight woodfiber boards were exactly the same as in examples 1 and 2. The ultimate strength of the boards was on the average 112 kp.

EXAMPLE 4

A comparison was made between the properties of boards with portland cement bond produced according to the invention and commercial boards with magnesia cement bond. In the production of the boards the wood fiber was wetted first with the mixing liquid, as in the preceding examples, dusted with the binder, and the whole was mixed in mixing drums with spiked rollers to obtain the molding compound. Then this material was fed over equalizing means to the heated molding duct. Boards of 2.5 cm thickness were produced.

|  | Portland Cement | Magnesia Cement |
| --- | --- | --- |
| wood fiber (30% reference kiln-dry moisture) | 3.90 kg | 3.90 kg |
| mixing liquid | 3.80 kg water | 5.30 kg $M_gSO_4$ solution 12% |
| binder | 4.70 kg cement | 4.70 kg caust. magnesia |
| heating gas temperature | 200°C. | 600°C. |
| molding time | 5 min. | 4 min. |
| mean breaking load of machine-fresh boards (support distance 47 cm) | 28 kp | 33 kp |
| storage time at ab. 40°C. | 10 days | 6 days |
| breaking load of stored boards (support distance 47 cm) | 100 kp | 90 kp |
| volumetric weight | 450 kg/cu m | 450 kg/cu m |

The foregoing table shows the amounts used, the temperatures and time conditions, as well as the results obtained, which represent mean values of several parallel tests. It can be seen that it is possible to produce in the belt-molding machine cement-bonded lightweight fiber boards which are similar in their properties to the magnesite-bonded boards.

What is claimed is:
1. Method for the production of cement-bonded molded articles comprising the steps of:
 a. feeding to a heated molding duct formed of endless belts a molding composition comprising a base material selected from the group consisting of wood fiber, wood chips, lignocelluloses, mineral fibers, glass fibers, plastic chips, expanded silicates, expanded glass and granules of foamed plastics and a binder consisting essentially of a portland cement which contains 1 to 30% by weight of a calcium-halogen aluminate of the composition $11CaO.7Al_2O_3.CaX_2$, wherein X is any halogen;
 b. heating the molding composition in the molding duct to cause the binder to set and form a molded article, and
 c. removing the molded article from the molding duct.
2. Method according to claim 1 wherein the molding compound in the molding duct is heated to a temperature of 45° to 120°C.
3. Method for the continuous production of cement-bonded molded articles comprising the steps of:
 a. continuously feeding to a heated molding duct formed of endless belts a molding composition comprising a base material selected from the group consisting of wood fiber, wood chips, lignocelluloses, mineral fibers, glass fibers, plastic chips, plastic fibers, expanded silicates, expanded glass and granules of foamed plastics and a binder consisting essentially of a portland cement which contains (i) 1 to 30% by weight of a calcium-halogen aluminate of the composition $11CaO.7Al_2O_3.CaX_2$ wherein X is any halogen and (ii) 1 to 12% by weight $SO_3$ in the form of sulphates selected from the group consisting of calcium sulphate, plaster of paris, gypsum, or mixtures thereof;
 b. heating the molding composition in the molding duct to a temperature of 45° to 120°C. to cause the binder to set and to form a molded article; and
 c. removing the molded article from the molding duct.
4. Method for the continuous production of cement-bonded molded articles comprising the steps of:
 a. continuously feeding to a heated molded duct formed of endless belts a molding composition comprising a base material selected from the groups consisting of wood fiber, wood chips, ligno-celluloses, mineral fibers, glass fibers, plastic chips, plastic fibers, expanded silicates, expanded glass or granules of foamed plastics and a binder consisting essentially of a portland cement which contains (i) 1 to 30% by weight of a calcium-halogen aluminate of the composition $11CaO.7Al_2O_3.CaX_2$, wherein X is any halogen, (ii) 1 to 12% by weight $SO_3$ in the form of sulphates selected from the group consisting of calcium sulphate, plaster of paris, gypsum, or mixtures thereof and (iii) one or more substances which reduce the calcium ion concentration in the liquid phase or bind calcium ions;
 b. heating the molding composition in the molding duct to a temperature of 45° to 120°C. to cause the binder to set and form a molded article; and
 c. removing the molded article from the molding duct.

5. Method according to claim 4 wherein the substances (iii) are selected from the group consisting of natural pozzoulana, synthetic pozzoulana, flue dust, fine-grained blast furnace slag, sodium fluoride, magnesium silico-fluoride, waterglass, caustic soda, sodium carbonate and sodium bicarbonate.

6. Method for the continuous production of lightweight cement-bonded boards comprising the steps of:
  a. continuously feeding to a heated molding duct formed of endless steel belts a molding composition comprising a base material selected from the group consisting of wood fiber, wood chips, lignocelluloses, mineral fibers, glass fibers, plastic chips, plastic fibers, expanded silicates, expanded clay, expanded glass and granules of foamed plastics, and a binder consisting essentially of a portland cement which contains 15 to 25% by weight of a calcium-halogen aluminate of the composition $11CaO.7Al_2O_3.CaX_2$, wherein X is any halogen;
  b. heating the molding composition in the molding duct by heating gases to a temperature of 70° to 90°C. for a period of about 6 minutes or less to cause the binder to set and form the boards; and
  c. removing the boards from the molding duct.

7. Method according to claim 6 wherein the portland cement additionally contains 1 to 12% by weight $SO_3$ in the form of sulphates selected from the group consisting of calcium sulphate, plaster of paris, gypsum, or mixtures thereof.

8. A method according to claim 1 in which the base material is expanded clay.

* * * * *